(12) United States Patent
Eromaki

(10) Patent No.: US 8,727,647 B2
(45) Date of Patent: May 20, 2014

(54) ACTUATOR

(75) Inventor: Marko Eromaki, Tampere (FI)

(73) Assignee: Nokia Corporation, Espoo (FI)

( * ) Notice: Subject to any disclaimer, the term of this patent is extended or adjusted under 35 U.S.C. 154(b) by 112 days.

(21) Appl. No.: 13/162,940

(22) Filed: Jun. 17, 2011

(65) Prior Publication Data

US 2012/0321291 A1    Dec. 20, 2012

(51) Int. Cl.
*G03B 9/02*    (2006.01)

(52) U.S. Cl.
USPC .......................................... 396/507; 335/220

(58) Field of Classification Search
CPC .............. G03B 5/00; G03B 5/02; G03B 5/04; G03B 7/085; G03B 7/095; G03B 9/02; G03B 9/08; G03B 9/36; G03B 9/38; G03B 9/40; G03B 9/42; G03B 9/44; G03B 2205/0007; G03B 2205/0015; G03B 2207/00; G03B 2207/005
USPC .................... 396/508, 507; 335/220
See application file for complete search history.

(56) References Cited

U.S. PATENT DOCUMENTS

| | | | |
|---|---|---|---|
| 4,505,563 A | | 3/1985 | Wong et al. |
| 4,512,647 A | | 4/1985 | Yamazaki |
| 6,565,270 B2 | | 5/2003 | Naganuma |
| 7,513,701 B2 | | 4/2009 | Naganuma |
| 2001/0004420 A1 * | 6/2001 | Kuwana et al. ................. 396/55 |
| 2004/0145435 A1 * | 7/2004 | Ohta et al. ....................... 335/78 |
| 2005/0185241 A1 * | 8/2005 | Johnson et al. ............... 359/227 |
| 2006/0257131 A1 * | 11/2006 | Yoon et al. .................... 396/133 |
| 2007/0110433 A1 * | 5/2007 | Masahiko ..................... 396/469 |
| 2007/0177279 A1 * | 8/2007 | Cho et al. ...................... 359/692 |
| 2009/0263119 A1 * | 10/2009 | Lim et al. ...................... 396/493 |
| 2010/0259822 A1 * | 10/2010 | Huang et al. .................. 359/557 |

* cited by examiner

*Primary Examiner* — Rodney Fuller
*Assistant Examiner* — Fang-Chi Chang
(74) *Attorney, Agent, or Firm* — Harrington & Smith

(57) ABSTRACT

An actuator including a magnetic field generator configured to provide a magnetic field; and a conductive element mounted for movement relative to the magnetic field generator wherein the conductive element forms a series of loops around a series of different axes.

20 Claims, 4 Drawing Sheets

US 8,727,647 B2

ACTUATOR

TECHNOLOGICAL FIELD

Embodiments of the present invention relate to an actuator. In particular, they relate to an electromagnetic actuator for controlling light exposure at a camera.

BACKGROUND

Current actuators for controlling light exposure at a camera suffer from a number of draw-backs. They may involve complex moving, often rotating, parts and may be bulky, expensive and difficult to assemble.

BRIEF SUMMARY

According to various, but not necessarily all, embodiments of the invention there is provided an actuator comprising: a magnetic field generator configured to provide a magnetic field; and a conductive element mounted for movement relative to the magnetic field generator wherein the conductive element forms a series of loops around a series of different axes.

According to various, but not necessarily all, embodiments of the invention there is provided a method of controlling a camera aperture comprising:

providing at least one magnetic field generator; and energizing an electromagnet formed from a conductive element mounted for resilient movement relative to the magnetic field generator.

According to various, but not necessarily all, embodiments of the invention there is provided an actuator comprising: a magnetic field generator configured to provide a magnetic field; and a conductive element mounted for resilient movement relative to the magnetic field generator when operated as an electromagnet.

BRIEF DESCRIPTION

For a better understanding of various examples of embodiments of the present invention reference will now be made by way of example only to the accompanying drawings in which.

DETAILED DESCRIPTION

Figure 1A:
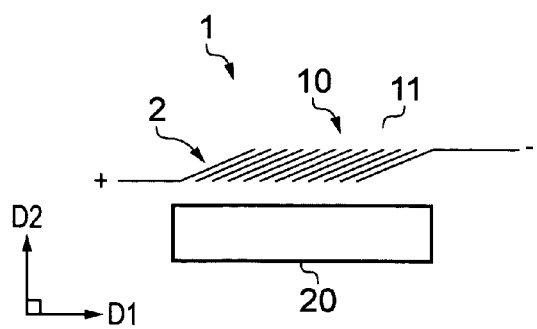
FIG. 1A is a schematic cross-sectional view of an actuator in a rest configuration.

The Figures illustrate an actuator 1 comprising: a magnetic field generator 20 configured to provide a magnetic field 24; and a conductive element 10 mounted for movement relative to the magnetic field generator 20. The conductive element 10 forms a series of loops 11 around a series of different axes 12.

Figure 1B:
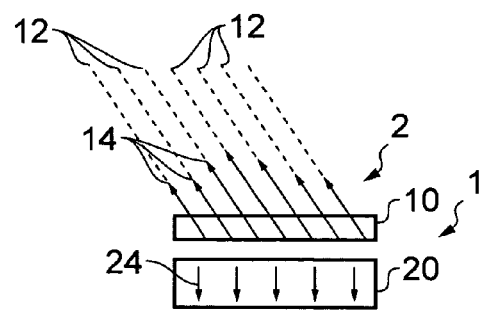
FIG. 1B is a side view of an actuator in a rest configuration illustrating the magnetic fields.
Figure 1C:
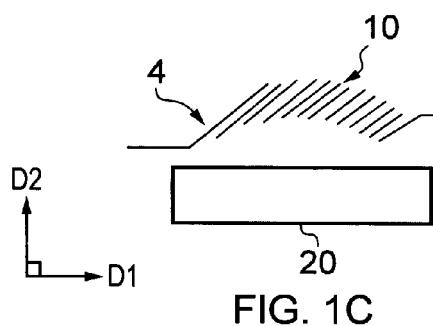
FIG. 1C is a schematic cross-sectional view of an actuator in an actuated configuration.
Figure 1D:
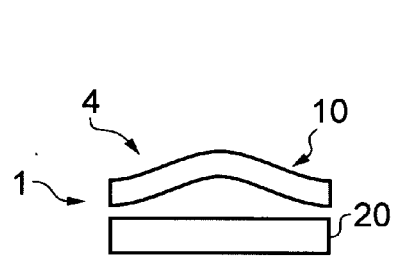
FIG. 1D is a side view of the actuator illustrated in FIG. 1B, when in an actuated configuration.

FIG. 1A is a cross-sectional view of an actuator 1 in a rest configuration 2 and FIG. 1B is a schematic side view of the actuator 1 in a rest configuration 2 which illustrates magnetic fields. FIG. 1C is a cross-sectional view of an actuator, as illustrated in FIG. 1A, in an actuated configuration and FIG. 1D is a schematic side view of the actuator 1, as illustrated in FIG. 1B, in an actuated configuration.

An actuator 1 comprises a magnetic field generator 20 and an adjacent conductive element 10. The conductive element 10 is configured to operate as an electromagnet that extends in a first direction D1 but which produces, when energized, a magnetic field with a strong component in a second direction D2 perpendicular to the first direction D1. When the electromagnet is not energized the conductive element 10 has a rest configuration 2. When the electromagnet is energized the conductive element 10 has an actuated configuration 4 in which the conductive element 10 is more bent than in the rest configuration 2. If the electromagnet is energized to different levels, then the conductive element 10 may have more than one actuated configuration 4 (e.g. different bends).

The magnetic field generator 20 is configured to provide a magnetic field 24. A major component of the magnetic field 24 produced by the magnetic field generator 20 in the vicinity of the conductive element 10 is in a second direction D2. The magnetic field generator 20 may be a permanent magnet.

The conductive element 10 is mounted for movement relative to the magnetic field generator 20. The conductive element 10 forms a series of loops 11 around a series of different axes 12.

The different axes 12 may be substantially parallel and substantially evenly spaced in the first direction D1 such that successive loops in the series of loops are substantially parallel but shifted in the first direction D1.

When the electromagnet is energized, a major component of the magnetic field produced by the looped conductive element 10 in the vicinity of the conductive element 10 is in a second direction D2 and in a sense that opposes the magnetic field in the second direction D2 produced by the magnetic field generator 20.

Thus the magnetic field 24 provided by the magnetic field generator 20 has an orientation to create a net force on the conductive element 10, when an electric current is provided through the conductive element 10 in a first direction D1, that moves the conductive element 10 relative to the magnetic field generator 20 in at least a second direction D2 perpendicular to the first direction D1.

The conductive element 10 is resiliently flexible. Therefore when the electromagnet formed by the conductive element 10 is no longer energized, the actuator returns from the actuated configuration 4 to the rest configuration 2.

Figure 2A:
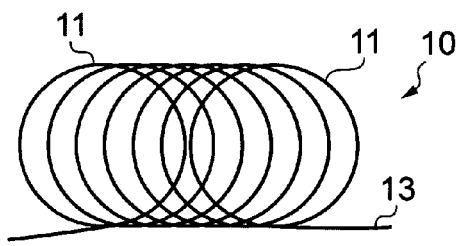
FIG. 2A illustrates in a plan perspective an example embodiment of a looped conductive element.
Figure 2B:
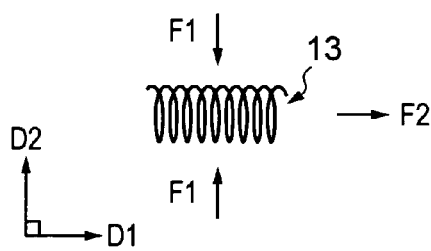
FIG. 2B illustrates from a side perspective how the example embodiment of the looped conductive element illustrated in FIG. 2A may be formed.
Figure 2C:
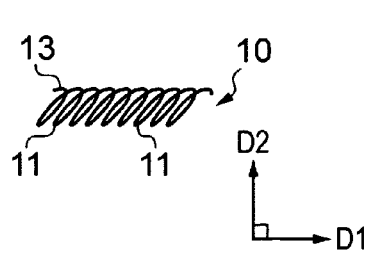
FIG. 2C illustrates from a side perspective the example embodiment of the looped conductive element illustrated in FIG. 2A.

FIG. 2A illustrates in a plan perspective an example embodiment of the conductive element 10 that forms a series of loops 11. FIG. 2B illustrates from a side perspective how the example embodiment of the looped conductive element 10 illustrated in FIG. 2A may be formed. FIG. 2C illustrates from a side perspective the example embodiment of the looped conductive element 10 illustrated in FIG. 2A.

Referring to FIG. 2B, the conductive element 10 illustrated in FIGS. 1A-1D may be formed as a flattened spiral coil 13 that extends in a first direction D1. A coil 13 in the form of a helix extends along its helical axis in the first direction D1. The coil 13 may be stiff but resiliently flexible. It may, for example, be formed from copper or metal wire. The coil 13 is stretched in the first direction D1 using a force F2 and is simultaneously flattened in the second direction D2 using a compressive force F1. The coil 13 permanently deforms into a stretched, flattened coil 13 which can then be used as a conductive element 10 in an actuator 1. The coil may in some embodiments comprise an electrically insulating covering.

A side view of the resultant stretched, flattened coil 13 is illustrated in FIG. 2C. A plan view of the resultant flattened coil 13 is illustrated in FIG. 2A.

It can be seen that adjacent loops 11 in the series of loops of the conductive element 10 partially overlap, but not all loops 11 in the series of loops overlap one another such that the series of loops extends in an overlapping arrangement of loops 11 in a first direction D1. It can be seen in FIG. 2C that each loop 11 in the series forms in side profile approximately the same angle to the first direction D1. Each loop 11 goes around its own virtual axis 12 (FIG. 1B). The different axes 12 may be substantially parallel and substantially evenly spaced in the first direction D1. When the looped conductive element 10 operates as an electromagnet, each loop generates a magnetic field and a major component of that magnetic field is aligned with the loop's virtual axis 12.

Figure 3A:
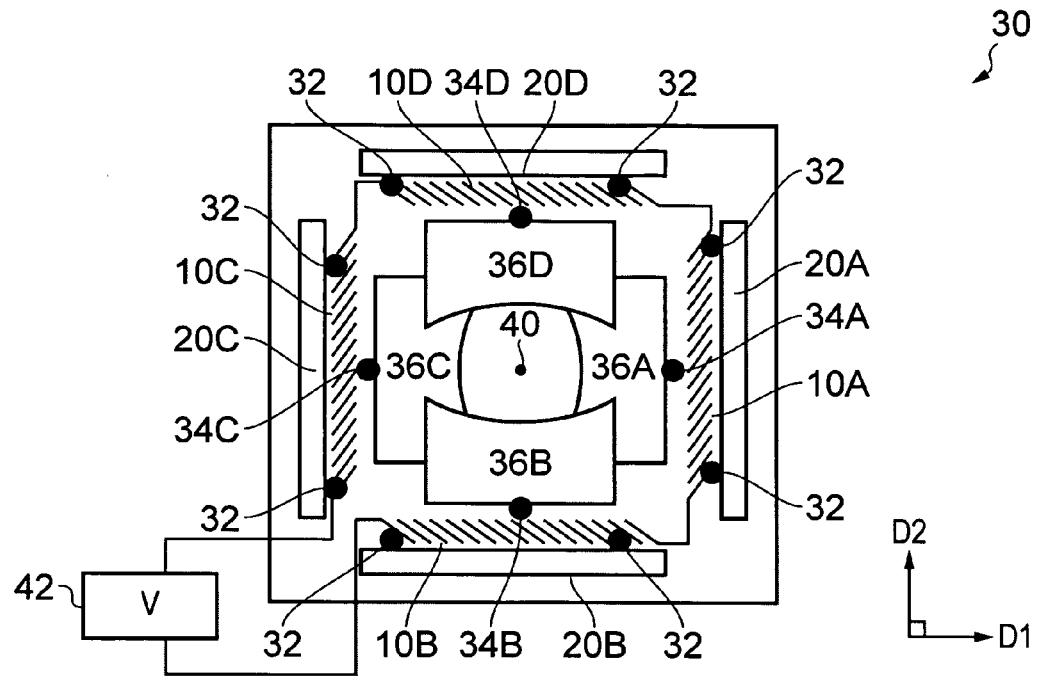
FIG. 3A illustrates a camera aperture for controlling light exposure at a camera, comprising a plurality of magnetic field generators but a single conductive element in a rest configuration.
Figure 3B:
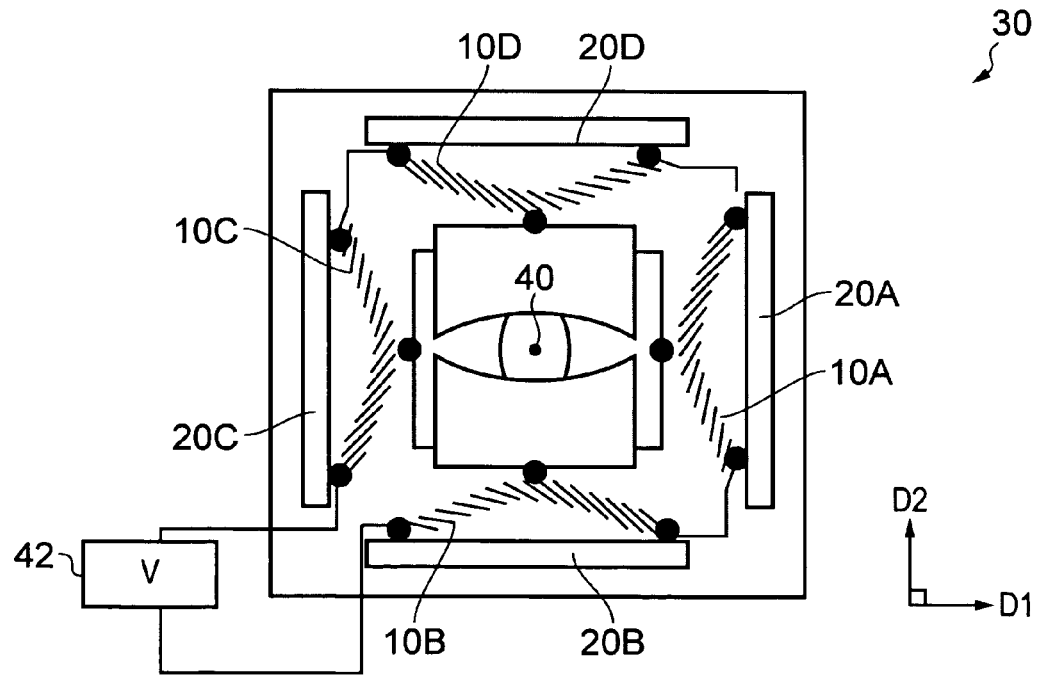
FIG. 3B illustrates a camera actuator for controlling light exposure at a camera, comprising a plurality of magnetic field generators but a single conductive element in an actuated configuration.

FIGS. 3A and 3B illustrate a camera aperture actuator 30 for controlling light exposure at a camera, comprising a plurality of magnetic field generators 20A-D but a single conductive element 10. FIG. 3A illustrates a rest configuration and FIG. 3B illustrates an actuated configuration. The actuated configuration is symmetrically actuated in this example.

The camera aperture actuator 30 comprises an arrangement of four actuators 1A, 1B, 1C, 1D each of which moves a respective opaque member 36A, 36B, 36C, 36D towards a central axis 40. The actuators 1A-1D may be as described previously.

The plurality of actuators 1A-1D are configured in a mutually orthogonal arrangement about the central axis 40. The actuators 1A-1D are used to simultaneously and symmetrically move the opaque member 36A, 36B, 36C, 36D towards a central axis 40. The function performed may be an iris function that reduces the aperture around the central axis 40 to a particular size determined by the current flowing through the conductive element 10. The function performed may alternatively or additionally be a shutter function that reduces the aperture around the central axis 40 rapidly to zero.

The first actuator 1A is oriented such that it moves its associated opaque member 36A in a −ve sense of the first direction D1. The second actuator 1B is oriented such that it moves its associated opaque member 36B in a +ve sense of the second direction D2 which is orthogonal to the first direction D1. The third actuator 1C is oriented such that it moves its associated opaque member 36C in a +ve sense of the first direction D1. The fourth actuator 1D is oriented such that it moves its associated opaque member 36D in a −ve sense of the second direction D2.

The actuators 1A-1D share a common single conductive element 10 that has a looped portion 10A of actuator 1A adjacent magnetic field generator 20A, a looped portion 10B of actuator 1B adjacent magnetic field generator 20B, a looped portion 10C of actuator 1C adjacent magnetic field generator 20C, a looped portion 10D of actuator 1D adjacent magnetic field generator 20D.

The actuators 1A-1D may be as described previously with reference to FIGS. 1A-1D and FIGS. 2A-2C. The looped portions 10A-10D correspond to the conductive element 10 described with reference to those Figures.

Each looped portion 10A-10D is fixed at its extremities 32 such that when the electromagnet formed by the looped portion 10A-10D is energized, the looped portion bends or flexes between its fixed points 32.

Each actuator 1A-1D is associated with a respective opaque member 36A-36D. Each opaque member 36A-36D is mounted for movement relative to each magnetic field generator 20A-20D. Each opaque member 36A may be mounted for movement in a plane substantially perpendicular to the central axis 40. In some embodiments the opaque members may move in a single plane or perhaps two shared parallel planes. In other embodiments, each opaque member 36A-36D moves in its own parallel plane.

Each looped portion 10A-10D in this example is directly fixed to a respective opaque member 36A-36B via a central point 34A. In other embodiments, the connection between the looped portions 10A-10D and the opaque members 36A-36B may be indirect. When the electromagnet formed by the looped portion 10A of actuator 1A is energized, the looped portion 10A bends or flexes between its fixed points 32 pushing its central point 34A and its associated opaque member 36A towards the central axis 40. Each actuator 1A-1D operates in a similar manner to move its respective opaque member 36A-36D in a mutually orthogonal direction.

In some embodiments rectilinear guides may be provided for the opaque members to ensure that when they are moved by the electromagnet actuator 1A-1D they move rectilinearly.

The energizing of the electromagnet actuators 1A-1D may be controlled by a controller 42. The controller 42 may form an integrated part of the camera aperture actuator 30 or it may be a part of a host apparatus that receives the camera aperture actuator 30. The controller 42 may generate an electric current or an electric voltage. It controls the electric current that passes through the single conductive element 10.

The actuators 1A-1D are preferably of similar or identical construction. As the looped portions 10A-10D of the conductive element 10 are in electrical series, the same electric current passes through them. As the looped portions 10A-10D of the conductive element 10 have the same inductance L, they generate the same or similar magnetic fields. Therefore the forces applied to the opaque members 36A-36D are the same or similar and they move simultaneously.

Figure 5:
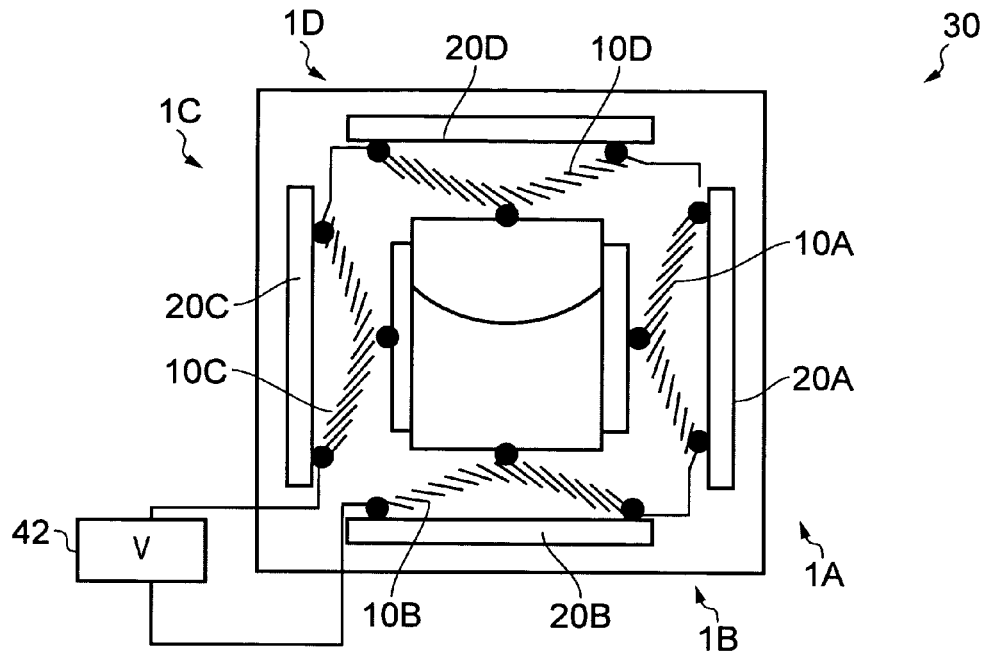
FIG. 5 illustrates a camera actuator for controlling light exposure at a camera, comprising a plurality of magnetic field generators and a common conductive element all of which are in a fully actuated configuration.

As the looped portions 10A-10D are resiliently flexible. The looped portion 10A-10D bend to an extent where the resilient force generated by the flexed looped portions 10A-10D is in balance with the force generated by the electromagnet actuator 1A-1D. Increasing the electric current through the respective looped portions 10A-10D increases the generated force and a new balance point is found where the looped portions 10A-109D are more bent. The controller 42 can therefore be used to control the size of the aperture formed by the respective opaque members 36A-36D about the central axis 40 and/or can be used to control the speed of movement of the opaque members 36A-36D. The camera aperture actuator 30 may therefore be used as an camera iris (FIGS. 3A and 3B) and/or as a shutter (FIG. 5).

In some embodiments, the opaque members 36A-36D may be designed to overlap. They may have concave extremities where they are closest to the central axis 40. In other embodiments the opaque members 36A-36D may be designed to abut. They may have extremities that are designed to closely correspond when they abut to form an opaque barrier.

Figure 4A:
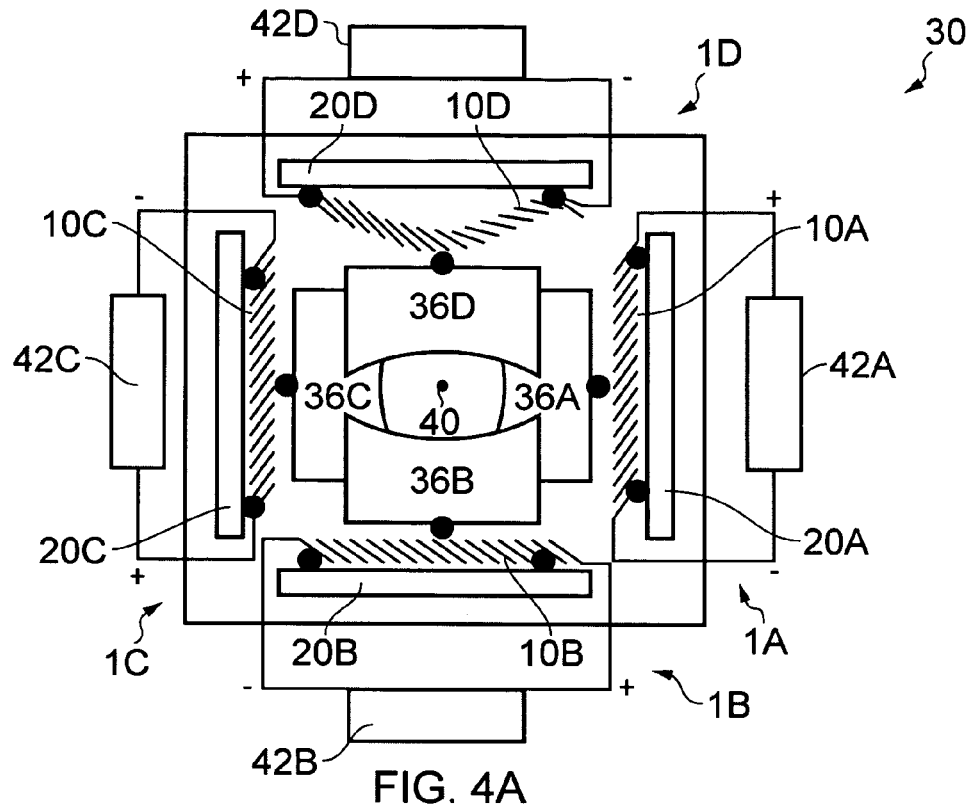
FIG. 4A illustrates a camera actuator for controlling light exposure at a camera, comprising a plurality of magnetic field generators each with a looped conductive element some of which are in a rest configuration and one of which is in an actuated configuration.
Figure 4B:
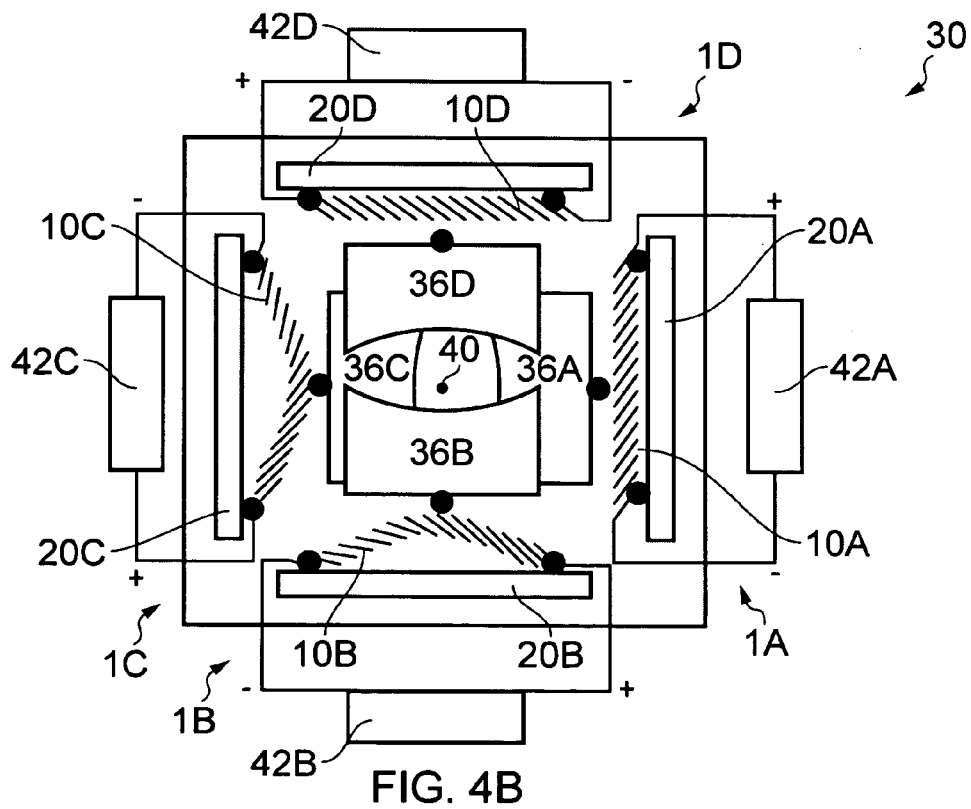
FIG. 4B illustrates a camera actuator for controlling light exposure at a camera, comprising a plurality of magnetic field generators each with a looped conductive element some of which are in a rest configuration and some of which are in an actuated configuration.

FIGS. 4A and 4B illustrates a camera aperture actuator 30 for controlling light exposure at a camera, comprising a plurality of magnetic field generators 20A-20D each with a respective independent conductive element 10A-10D. FIG. 4A illustrates a first asymmetric actuated configuration and FIG. 4B illustrates a second asymmetric actuated configuration. Although asymmetric actuated configurations are illustrated, it should be appreciated that the illustrated camera aperture actuator 30 can controllably generate symmetric or asymmetric configurations.

The camera aperture actuator 30 comprises an arrangement of four independent actuators 1A, 1B, 1C, 1D each of which independently moves a respective opaque member 36A, 36B, 36C, 36D towards a central axis 40. The actuators 1A-1D may be as described previously in relation to FIGS. 1A-1D and 2A-2C.

The plurality of actuators 1A-1D are configured in a mutually orthogonal arrangement about the central axis 40. The actuators 1A-1D are used to independently move the respective opaque member 36A, 36B, 36C, 36D towards a central axis 40. The function performed may be an iris function that symmetrically or asymmetrically reduces the aperture around the central axis 40 to a particular size and shape determined by the currents flowing through the independent conductive elements 10A-10D. The function performed may alternatively or additionally be a shutter function that reduces the aperture around the central axis 40 rapidly to zero.

The first actuator 1A is oriented such that it moves its associated opaque member 36A in a −ve sense of the first direction D1. The second actuator 1B is oriented such that it moves its associated opaque member 36B in a +ve sense of the second direction D2 which is orthogonal to the first direction D1.

The third actuator 1C is oriented such that it moves its associated opaque member 36C in a +ve sense of the first direction D1. The fourth actuator 1D is oriented such that it moves its associated opaque member 36D in a −ve sense of the second direction D2.

The independent actuators 1A-1D each comprise their own conductive element 10A-10D that is independently energized to form an electromagnet.

Each independent conductive element 10A-10D is fixed at its extremities 32 such that when the electromagnet formed by the conductive element 10A-10D is energized, the conductive element 10A-10D bends or flexes between its fixed points 32.

Each actuator 1A-1D is associated with a respective opaque member 36A-36D. Each opaque member 36A-36D is mounted for movement relative to each magnetic field generator 20A-20D. Each opaque member 36A may be mounted for movement in a plane substantially normal to the central axis 40. In some embodiments the opaque members may move in a single plane or perhaps two shared parallel planes. In other embodiments, each opaque member 36A-36D moves in its own parallel plane.

Each conductive element 10A-10D in this example is directly fixed to a respective opaque member 36A-36B via a central point 34A. In other embodiments, the connection between the conductive elements 10A-10D and the opaque members 36A-36B may be indirect. When the electromagnet formed by the conductive element 10A of actuator 1A is energized, the looped portion 10A of the conductive element 10A bends or flexes between its fixed points 32 pushing its central point 34A and its associated opaque member 36A towards the central axis 40. Each actuator 1A-1D operates in a similar manner to move its respective opaque member 36A-36D in a mutually orthogonal direction.

In some embodiments rectilinear guides may be provided for the opaque members 36A-36D to ensure that when they are moved by the electromagnet actuator 1A-1D they move rectilinearly.

The energizing of the electromagnet actuators 1A-1D may be controlled by one or more controllers 42A-42D. Each electromagnetic actuator 1A-1D is independently controlled. The controller(s) 42A-42D may form an integrated part of the camera aperture actuator 30 or it may be a part of a host apparatus that receives the camera aperture actuator 30. A controller 42A-42D may generate an electric current or an electric voltage. It controls the electric current that passes through its associated conductive element 10A-10D.

A controller 42A controls the electric current provided to actuator 1A. This electric current controls the magnetic field generated by the looped portion of the conductive element 10A and in consequence the force applied to the opaque member 36A. Each of the controllers 42A-42D similarly control the force applied to the respective opaque member 36A-36D via the respective conductive element 10A-10D.

The looped portions of the conductive elements 10A-10D are resiliently flexible. Therefore the looped portions of the resilient elements 10A-10D bend to an extent where the resilient force generated by the flexed looped portions of the conductive elements 10A-10D is in balance with the force generated by the respective electromagnet actuator 1A-1D. Increasing the electric current through the respective conductive elements 10A-10D increases the generated force and a new balance point is found where the conductive elements 10A-10D are more bent. The controller 42 can therefore be used to control the size and shape of the aperture formed by the respective opaque members 36A-36D about the central axis 40 and/or can be used to control the speed of movement of the opaque members 36A-36D.

The actuators 1A-1D may be of similar or identical construction. In this case similar or identical controllers 42A-42D may be used in the same way to control the actuators 1A-1D.

FIG. 5 illustrates a camera aperture actuator 30 for controlling light exposure at a camera, comprising a plurality of magnetic field generators and a common conductive element all of which are in a fully actuated configuration. This Figure therefore illustrates an embodiment similar to that illustrated in FIGS. 3A and 3B, but in a shutter application.

Figure 6:
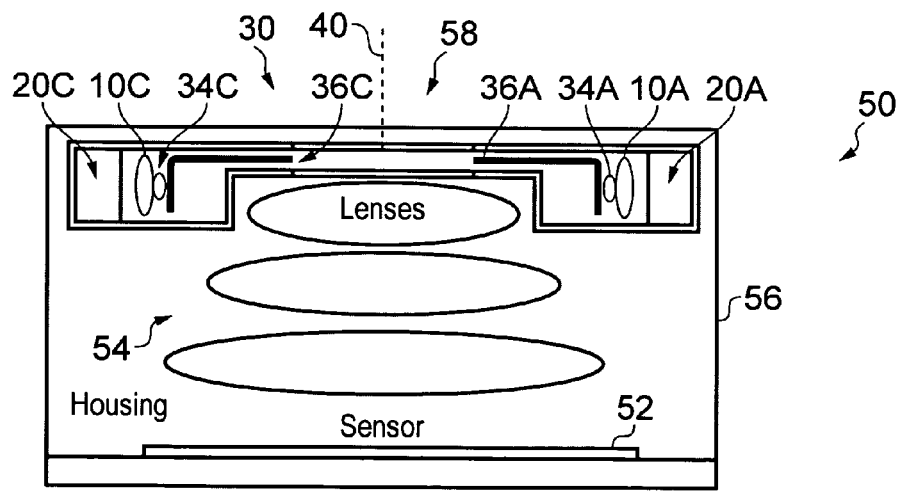
FIG. 6 illustrates a camera apparatus for controlling a camera aperture and comprising a camera aperture actuator.

FIG. 6 illustrates a camera apparatus 50 for controlling a camera aperture 58 and comprising a camera aperture actuator 30 as previously described.

The camera apparatus 50 comprises: a housing 56 within which is a sensor 52, one or more lenses 54 and a camera aperture actuator 30 as previously described for controlling the camera aperture 58.

The sensor 52 may be an array of light sensors for capturing colored images.

The camera apparatus 50 may comprise one or more controllers 42 for controlling the actuators 1A-1D of the camera aperture actuator 30.

Where the camera aperture actuator 30 comprises independent actuators 1A-1D, each independent actuator may be controlled in response to input received from the sensor 53. The one or more controllers 42A-42D may provide independently controlled electric current through each of the conductive elements 10A-10D responsive to the sensor 53.

For example, if a portion of the sensor 53 is over exposed because of a lens flare then the camera apparatus 50 may move the opaque members 36A-46D of the actuators 1A-1D into a configuration that removes the lens flare. This may, for example, involve the independent actuation of the actuators 1A-1D to independently move the respective opaque members 36A-36D by differing amounts and create an asymmetric configuration of opaque members 36A-36D.

It should be appreciated that the camera aperture actuator 30 illustrated in FIG. 6 may in one embodiment (FIGS. 3A-3B) operate opaque members symmetrically and in another embodiment (FIGS. 4A-4B) operate opaque members symmetrically and/or asymmetrically.

It should be appreciated that the camera aperture actuator 30 illustrated in FIG. 6 may in one embodiment operate as a camera iris only, in another embodiment operate as a camera shutter only and in a further embodiment operate as a camera iris and a camera shutter.

Implementation of the controllers described may be in hardware alone (a circuit, a processor . . . ), have certain aspects in software including firmware alone or can be a combination of hardware and software (including firmware).

A controller may be implemented using instructions that enable hardware functionality, for example, by using executable computer program instructions in a general-purpose or special-purpose processor that may be stored on a computer readable storage medium (disk, memory etc) to be executed by such a processor.

As used here 'module' refers to a unit or apparatus that excludes certain parts/components that would be added by an end manufacturer or a user. An actuator 10 including those illustrated in FIGS. 1A-1D may be a module. The camera aperture actuator 30, including those illustrated in FIGS. 3A-3B, 4A-4B, 5 may be a module.

Figure 7:
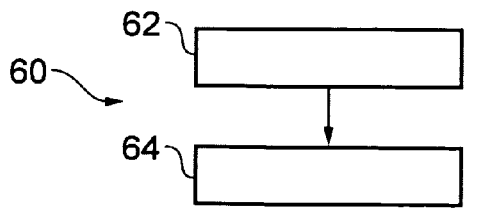
FIG. 7 illustrates a method of controlling a camera aperture.

FIG. 7 illustrates a method 60 of controlling a camera aperture comprising: providing 62 at least one magnetic field generator; and energizing 64 an electromagnet formed from a conductive element mounted for resilient movement relative to the magnetic field generator.

Although embodiments of the present invention have been described in the preceding paragraphs with reference to various examples, it should be appreciated that modifications to the examples given can be made without departing from the scope of the invention as claimed. For example, an opaque member may be a thin film or sheet element. A opaque member may be made from a non-ferrite metal or plastic, for example.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An actuator comprising:
a magnetic field generator configured to provide a magnetic field; and
a conductive element configured to receive an electric current, wherein the conductive element is mounted for resilient movement relative to the magnetic field generator when the conductive element is energized so as to operate as an electromagnet, wherein the conductive element forms a series of loops around a series of different axes.

2. An actuator as claimed in claim 1, wherein the resilient movement comprises a bending of the conductive element.

3. An actuator as claimed in claim 2, wherein the conductive element has a rest configuration and one or more actuated configurations in which the conductive element is more bent than in the rest configuration.

4. An actuator as claimed in claim 1, wherein adjacent loops in the series of loops partially overlap, but not all loops in the series of loops overlap one another such that the series of loops extends in an overlapping arrangement of loops in a first direction.

5. An actuator as claimed in claim 1, wherein the different axes are substantially parallel.

6. An actuator as claimed in claim 1, wherein the different axes are substantially evenly spaced in the first direction such that successive loops in the series of loops are substantially parallel but shifted in the first direction.

7. An actuator as claimed in claim 1, wherein the conductive element is a flattened spiral coil that extends in a first direction and is flattened in a second direction perpendicular to the first direction.

8. An actuator as claimed in claim 1, wherein the magnetic field provided by the magnetic field generator has an orientation to create a net force on the conductive element, when an electric current is provided through the conductive element in a first direction, that moves the conductive element relative to the magnetic field generator in at least a second direction perpendicular to the first direction.

9. An actuator as claimed in claim 1, wherein the magnetic field provided by the magnetic field generator has an orientation substantially in a second direction perpendicular to a first direction in which electric current is provided through the conductive element.

10. An actuator as claimed in claim 1, comprising a plurality of magnetic field generators, each configured to provide a magnetic field with a different orientation; and a plurality of independent conductive elements each mounted for movement relative to a respective magnetic field generator wherein each conductive element forms a series of loops about a different series of different axes.

11. An actuator as claimed in claim 10, wherein the plurality of magnetic field generators are configured in a mutually orthogonal arrangement about a central axis.

12. An apparatus for controlling an aperture of a camera comprising an actuator as claimed in claim 10, comprising one or more controllers for providing an independently controlled electric current through each of the conductive elements.

13. An apparatus as claimed in claim 12, further comprising a plurality of light sensors, wherein the one or more controllers for providing an independently controlled electric current through each of the conductive elements is/are responsive to the plurality of light sensors.

14. An apparatus as claimed in claim 13, wherein the plurality of conductive elements control a camera iris that has symmetric and asymmetric operation.

15. An apparatus as claimed in claim 14, wherein the plurality of conductive elements control a camera iris that has shutter operation.

16. An actuator as claim in claim 1, comprising a plurality of magnetic field generators, each configured to provide a magnetic field with a different orientation, wherein the conductive element is mounted for movement relative to at least one magnetic field generator, wherein the conductive element forms a series of loops about a series of different axes.

17. An actuator as claimed in claim 16, further comprising a plurality of opaque members each of which is moved by a conductive element.

18. An apparatus for controlling an aperture of a camera comprising an actuator as claimed in claim 16, comprising a controller for providing a controlled electric current through the conductive element.

19. An apparatus as claimed in claim 1, wherein the conductive element is configured to form an elongate coil defining an elongate axis and wherein the apparatus is configured for resilient movement of the conductive member in a direction perpendicular to the elongate axis.

20. A method of controlling a camera aperture comprising:

providing at least one magnetic field generator; and energizing an electromagnet formed from a conductive element mounted for resilient movement relative to the magnetic field generator wherein the conductive element forms a series of loops around a series of different axes.

* * * * *